United States Patent
Staley, II

(10) Patent No.: US 11,297,812 B2
(45) Date of Patent: Apr. 12, 2022

(54) ILLUMINATING MARINE FISH ATTRACTOR

(71) Applicant: Jesse Turner Staley, II, Manvel, TX (US)

(72) Inventor: Jesse Turner Staley, II, Manvel, TX (US)

(*) Notice: Subject to any disclaimer, the term of this patent is extended or adjusted under 35 U.S.C. 154(b) by 86 days.

(21) Appl. No.: 16/659,320

(22) Filed: Oct. 21, 2019

(65) Prior Publication Data
US 2020/0137993 A1 May 7, 2020

Related U.S. Application Data

(60) Provisional application No. 62/748,182, filed on Oct. 19, 2018.

(51) Int. Cl.
*A01K 85/01* (2006.01)
*F21V 33/00* (2006.01)

(52) U.S. Cl.
CPC ............ *A01K 85/01* (2013.01); *F21V 33/008* (2013.01)

(58) Field of Classification Search
CPC .............................. F21V 33/008; A01K 85/01
See application file for complete search history.

(56) References Cited

U.S. PATENT DOCUMENTS

| | | | |
|---|---|---|---|
| 1,192,001 A * | 7/1916 | Ryan | A01K 85/00 43/42 |
| 3,079,721 A | 3/1963 | Smith | |
| 3,177,604 A | 4/1965 | Ewing | |
| 3,510,978 A | 5/1970 | Murdock | |
| 3,626,173 A | 12/1971 | Harvey | |
| 4,020,580 A * | 5/1977 | Chappell | A01K 85/01 43/17.5 |
| 5,133,145 A | 7/1992 | McDonald | |
| 6,123,593 A * | 9/2000 | Mercer | B63B 22/18 441/26 |
| 9,462,796 B1 * | 10/2016 | Ellis | A01K 97/06 |

FOREIGN PATENT DOCUMENTS

WO WO2004057948 A2 7/2004

* cited by examiner

*Primary Examiner* — Thomas M Sember

(57) ABSTRACT

An illuminating marine fish attractor includes a bait reservoir, an insulated container, a floating deck, at least one illuminating device, a power source, a power switch, and a floating line. The bait reservoir is attached to the floating deck and attract fishes towards the floating deck. The illuminating device is connected onto the floating deck so that the bait reservoir can be illuminated. To illuminate the bait reservoir, the illuminating device is electrically connected to the power source through the power switch and oriented toward the bait reservoir. The floating deck and the insulated container are tethered to each other by the floating line so that the floating deck can be utilized within a body of water while the insulated cooler functions as a base for the floating line.

9 Claims, 8 Drawing Sheets

ILLUMINATING MARINE FISH ATTRACTOR

The current application claims a priority to the U.S. Provisional Patent application Ser. No. 62/748,182 filed on Oct. 19, 2018. The current application is filed on Oct. 21, 2019 while Oct. 19, 2019 was on a weekend.

FIELD OF THE INVENTION

The present invention generally relates to fishing and fishing accessories. More specifically, the present invention relates to portable and illuminating fishing accessories which facilitate the attraction of fish to a specific area.

BACKGROUND OF THE INVENTION

Fishing is one of the most popular outdoor activities performed by thousands of people around the world. In general, fishermen utilize a fishing device, such as a fishing pole, along with bait and/or lures to help attract fish. Bait and lures can comprise various living and/or artificial accessories with different capabilities to attract different types of fish. While multiple kinds of bait and lures have been provided over the years to help fishermen attract various types of fish, most bait and lures are often inadequate when fishing in low-light to dark environments. To help fishermen attract fish in low-light to dark environments, various devices have been provided to help overcome the lighting limitations of bait and lures. Some of the devices provided are brightly colored lures provided to facilitate the attraction of fish in poorly illuminated environments. Further, illuminated lures have been provided to help attract fish in dark environments. Unfortunately, these brightly colored lures and/or illuminated lures often fail to attract fish in an efficient manner. To overcome these limitations, devices such as fishing light lures have been provided. These devices often comprise a more powerful illumination mechanism, such as a powerful night light, which help attract baitfish and other similar animals, which in turn attract the desired fish. Unfortunately, most of the available fishing light lures comprise a structure with an integrated power mechanism which provides limited power and adds weight to the fishing light lure. In turn, the added weight increases the load to the floatation mechanism of the fishing light lure, which further limits the capabilities of the fishing light lure. Thus, there is a need for a more efficient fishing light lure.

An objective of the present invention is to provide an illuminating marine fish attractor. The illuminating marine fish attractor creates a natural self-contained illuminated "bait-ball" to attract fish while boat fishing, bayou fishing, canal fishing, in-land fishing, deep water fishing, stream fishing, kayak fishing, land-lock fishing, canoe reef fishing, pier fishing, freshwater lake fishing, saltwater fishing, etc. The illuminating marine fish attractor comprises one or more Light-Emitting Diode (LED) marine lights set into the bottom of a float chassis with one of four LED light colors (blue, white, red, or green).

SUMMARY OF THE INVENTION

The present invention provides an illuminating marine fish attractor. The illuminating marine fish attractor preferably comprises a structure with a base, such as an insulated cooler, with a floating light deck. The floating light deck illuminates a body of water along with a clear containment container. The containment container allows users to introduce a live and natural bait as the containment container is illuminated through the floating light deck. Resultantly, the containment container functions as a bait-ball to help attract marine life.

DETAIL DESCRIPTIONS OF THE INVENTION

Figure 1:
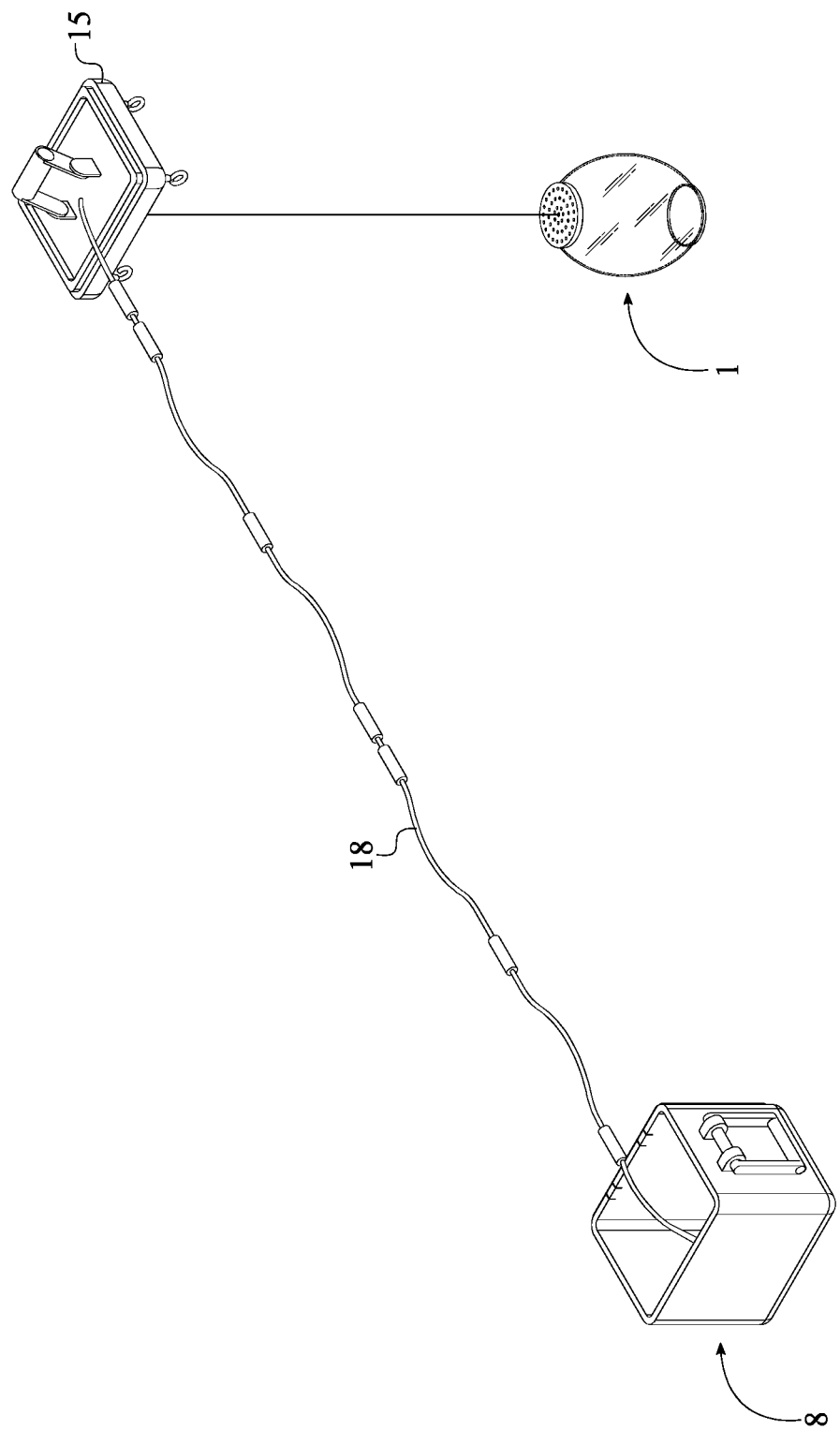
FIG. 1 is a perspective view of the present invention, wherein the floating deck positioned away from the insulated container and the bait reservoir is hanging from the floating deck.

All illustrations of the drawings are for the purpose of describing selected versions of the present invention and are not intended to limit the scope of the present invention.

The present invention is an illuminating marine fish attractor that functions as a fishing accessory. More specifically, the present invention can be used for boat fishing, bayou fishing, canal fishing, in-land fishing, deep water fishing, stream fishing, kayak fishing, land-lock fishing, canoe reef fishing, pier fishing, freshwater lake fishing, and saltwater fishing so that fish can be lured during daytime and nighttime fishing.

The present invention comprises a bait reservoir 1, an insulated container 8, a floating deck 15, at least one illuminating device 16, a power source 17, a power switch 22, and a floating line 18 as shown in FIG. 1-4. In reference to the general configuration of the present invention, the bait reservoir 1 that functions as a storage container 2 for live and natural baits is attached to the floating deck 15. As a result, the floating deck 15 is deployed within a body of water, the bait reservoir 1 is able to sink into a body of water and hang from the floating deck 15. The least one illuminating device 16 is connected onto the floating deck 15 and oriented toward the bait reservoir 1. Furthermore, the least one illuminating device 16 is electrically connected to the power source 17 through the power switch 22 so that the bait reservoir 1 can be illuminated under low light conditions. Due to the illuminated bait reservoir 1, live and natural baits can be visible within a body of water thus luring fishes toward the present invention. The floating deck 15 and the insulated container 8 are tethered to each other by the floating line 18 as the insulated container 8 functions similar to an anchor.

The bait reservoir 1 is a containment container that can hold live and natural baits. In reference to FIG. 1-2, the bait reservoir 1 comprises a storage container 2, a perforated lid 4, and a connector line 5. The storage container 2 is preferably a transparent container so that the live and natural baits can be visible to fishes. A first end 6 of the connector line 5 is preferably connected to the perforated lid 4, thus providing a fixed connection between the connector line 5 and the storage container 2. A second end 7 of the connector line 5 is centrally attached to the floating deck 15 so that the connector line 5 is able to tether the storage container 2 to the floating deck 15. Preferably, a carabiner or any other similar type of fastener is connected to the second end 7 of the connector line 5 so that the floating deck 15 can be easily engaged or disengaged with the connector line 5. The perforated lid 4 is attached to a rim 3 of the storage container 2 so that the user can keep the live and natural baits within the storage container 2 thus preventing them from escaping. More specifically, the user can first fill the storage container 2 with live and natural baits. Then, the storage container 2 is closed with the perforated lid 4 so that the live and natural baits cannot escape. Once the storage container 2 and the attached perforated lid 4 are dropped into a body of water, the storage container 2 is able to sink as the additional water enters into the storage container 2 through the perforated lid 4. However, the storage container 2 and the attached perforated lid 4 are able to hang from the floating deck 15 due to the connector line 5. Optionally, the first end 6 can also be concentrically connected to the storage container 2 instead of the perforated lid 4 as the present invention is able to provide the same functionality.

The insulated container 8 functions as a storage box for the rest of the component of the present invention and also a portable ice box. In reference to FIG. 6-7, the insulated container 8 comprises a top edge 9, a base 10, a lateral wall 11, and a storage compartment 12. More specifically, the top edge 9 and the base 10 are oppositely positioned of each other as the lateral wall 11 is perimetrically connected around the base 10. Resultantly, the storage compartment 12 is delineated by the lateral wall 11 and the base 10. The storage compartment 12 provides the necessary storage area within the insulated container 8 so that the user can simply place rest of the components of the present invention during transportation and storage. Furthermore, the storage compartment 12 also functions as a portable ice box as the base 10 and the lateral wall 11 can provide thermal insulation and additional padding to protect the stored items within.

Figure 2:
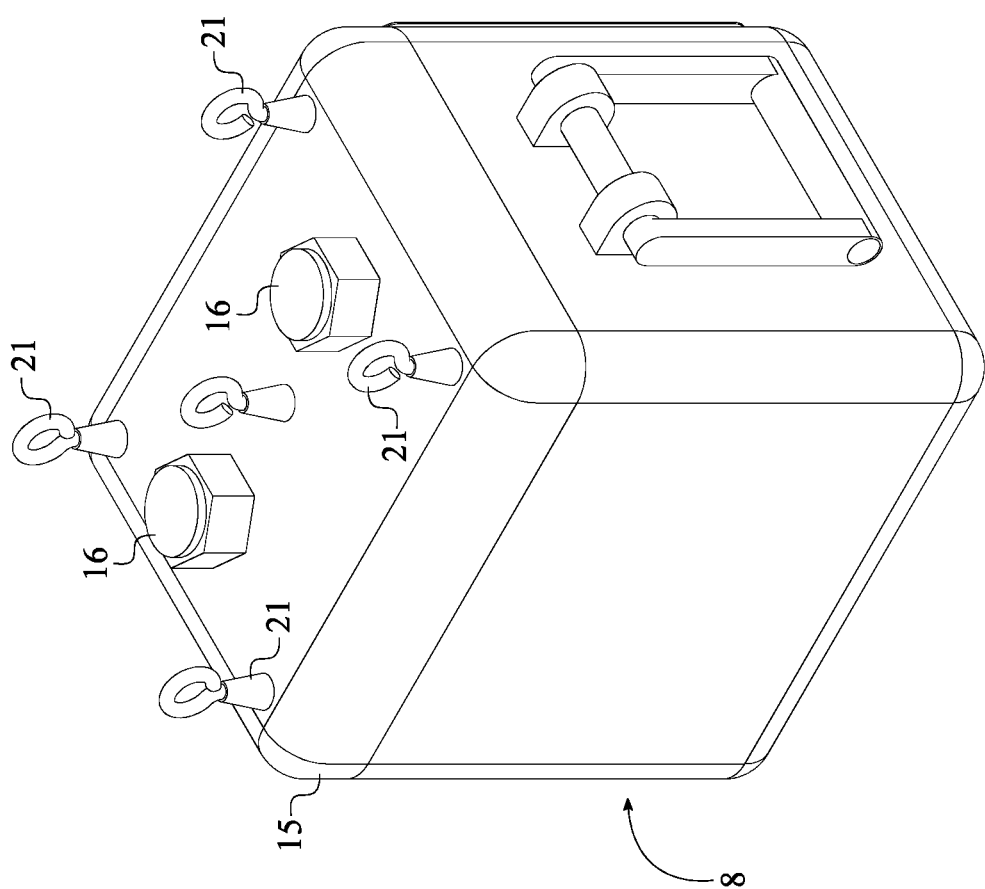
FIG. 2 is a top perspective view of the present invention, wherein the floating deck is positioned atop the insulated container thus covering the storage compartment.

The floating deck 15 is a structure body which serves as a lid for the insulated container 8 as well as the carrier for the at least one illuminating device 16. The floating deck 15 comprises a frame/structure that matches the shape and size of the top edge 9. As can be seen in FIG. 1-2, the floating deck 15 is preferably a rectangular structure with a size matching the size of the rectangular shape top edge 9.

Figure 8:
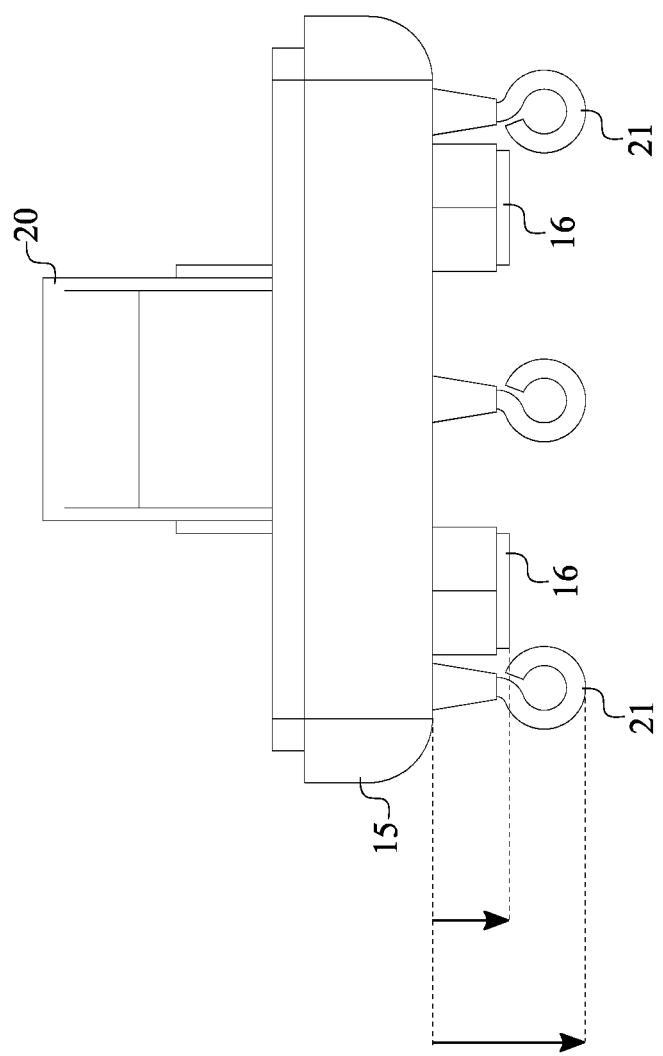
FIG. 8 is a side view of the floating deck, wherein the height of each of the plurality of legs being larger than the height of the at least one illuminating device.

In reference to FIG. 1-2 and FIG. 8, the present invention further comprises at least one container handle 13. More specifically, the container handle 13 is externally positioned to the insulated container 8 and hingedly connected to the lateral wall 11. As a result, the container handle 13 allows the user to easily grasp and carry the insulated container 8. Preferably, the at least one container handle 13 is a first handle and a second handle within the present invention. The first handle and the second handle are oppositely positioned of each other about the insulated container 8 thus providing equal weight distribution when the insulated container 8 is carried by the user. Furthermore, the hinged connection of the first handle and the second handle allows both handles to rest against the lateral wall 11 when the insulated container 8 is not carried by the user.

Figure 7:
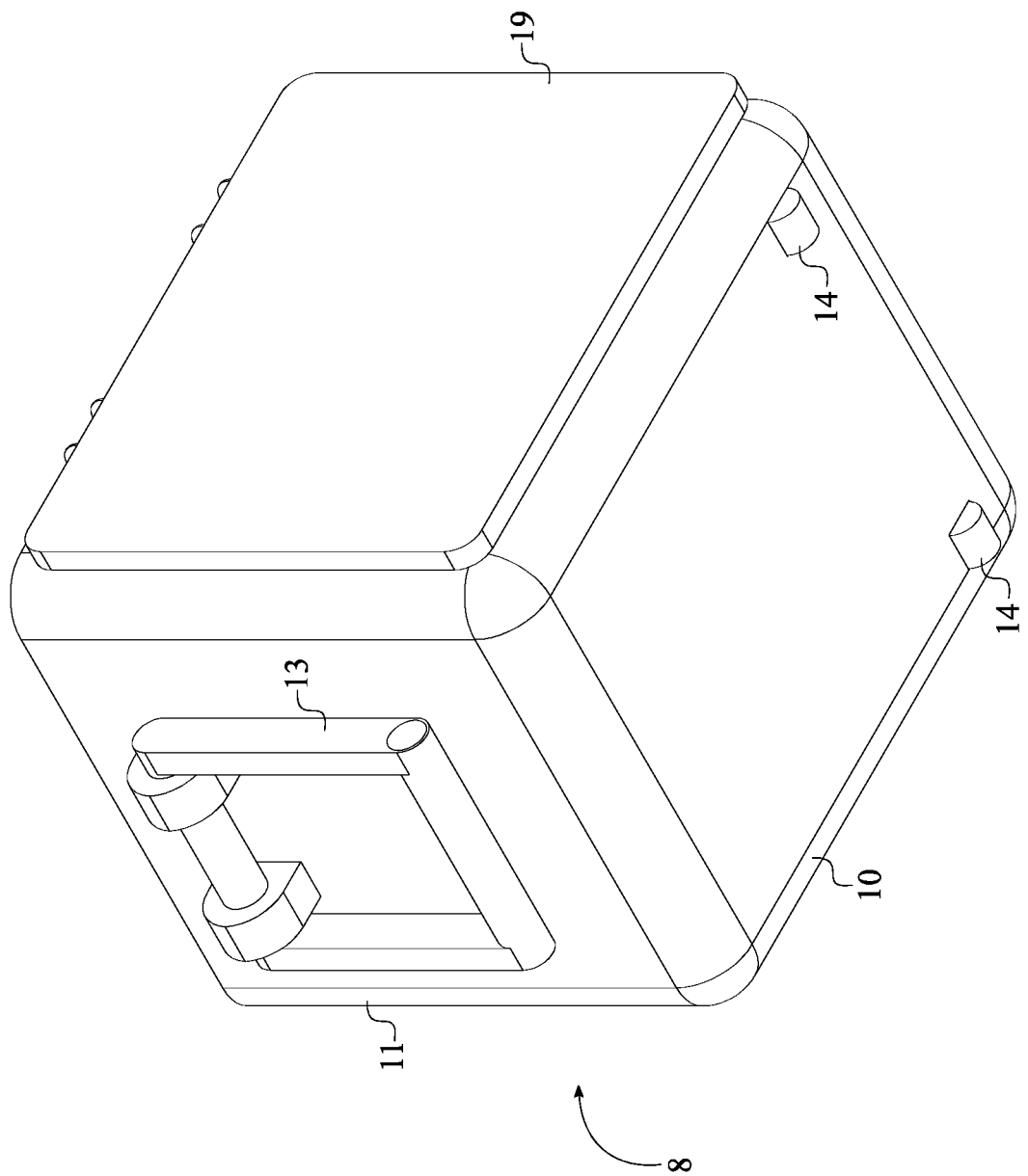
FIG. 7 is a bottom perspective view of the insulated container showing the at least one set of wheels.

In reference to FIG. 7, the present invention further comprises at least one set of wheels 14. More specifically, the set of wheels 14 are externally positioned to the insulated container 8 and rotatably connected to the base 10. As a result, the user is able to pull the insulated container 8 along the ground surface. Preferably, the at least one set of wheels 14 is a single set and rotatably connected one end of the base 10 as the insulated container 8 is pulled from opposite end. However, the number wheel sets are not limited to a single set and be a plurality of sets. Furthermore, the at least one set of wheels 14 can be made to accommodate on-road and off-road conditions.

Figure 6:
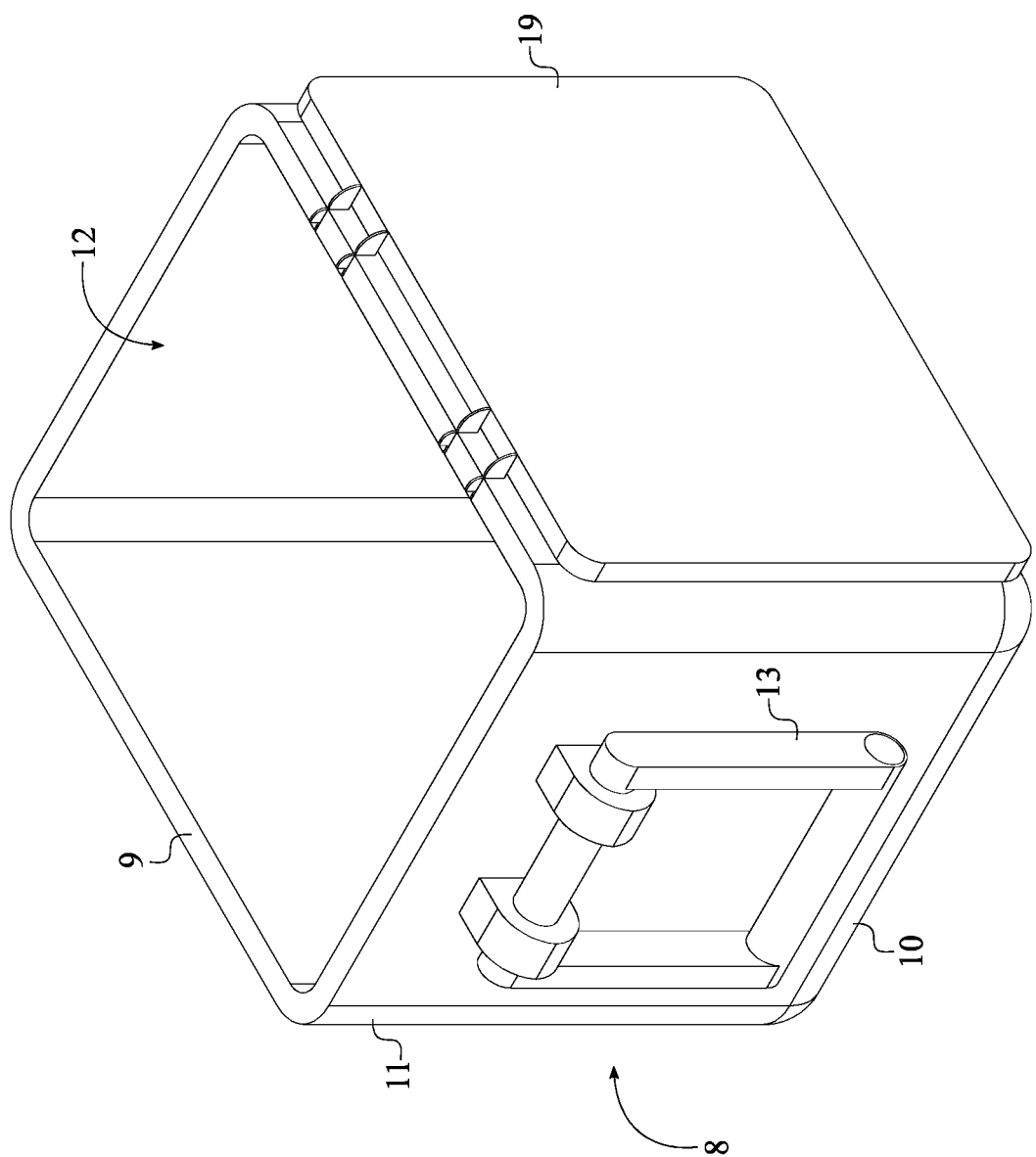
FIG. 6 is a top perspective view of the insulated container showing the storage compartment and the cover.

In reference to FIG. 6, the present invention further comprises a cover 19. The cover 19 is hingedly connected to the lateral wall 11 and positioned adjacent to the top edge 9. The storage compartment 12 being selectively enclosed by the cover 19 to convert the insulated container 8 into an ice box when the floating deck 15 is utilized within a body of water. More specifically, the cover 19 is able to enclose the storage compartment 12 so that the insulated container 8 is able to fully function as an ice box once the floating deck 15 is not accessible. When the storage compartment 12 is enclosed by the floating deck 15, the cover 19 can be positioned adjacent to the lateral wall 11 due to the hinged connection.

Figure 3:
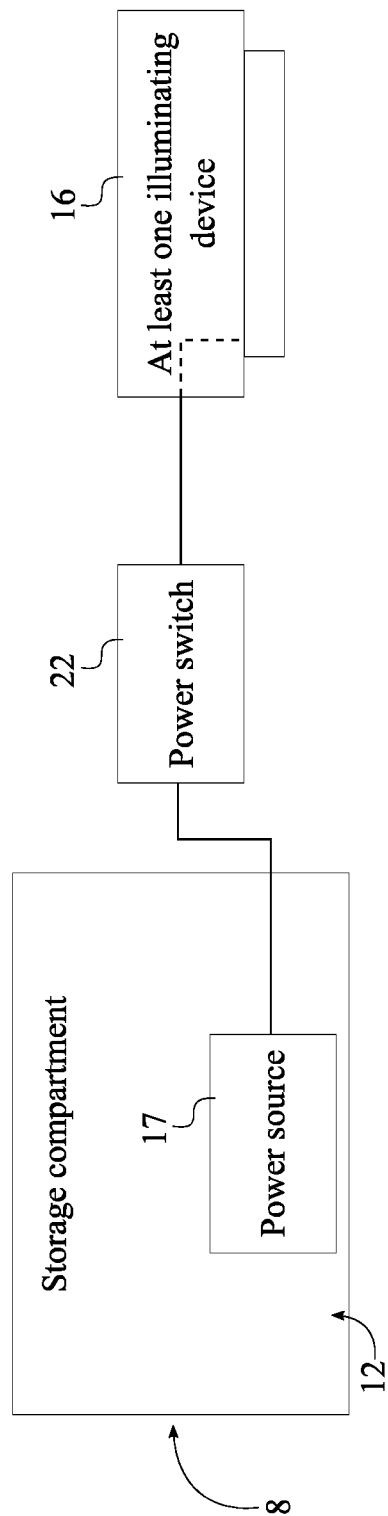
FIG. 3 is an electrical schematic view showing the power source being positioned within the storage compartment.
Figure 4:
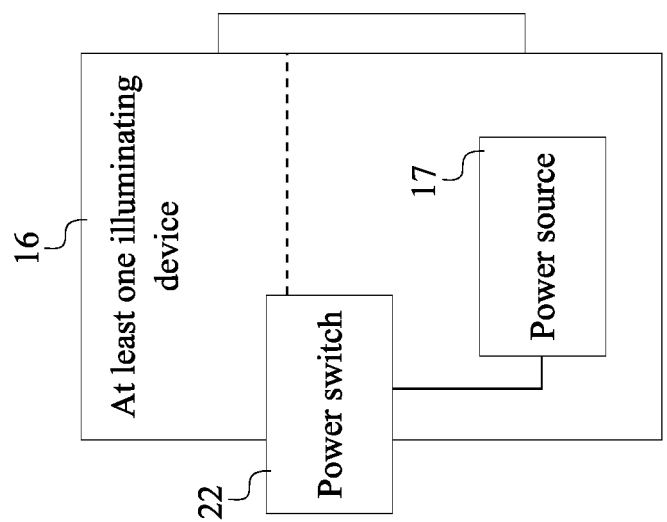
FIG. 4 is an electrical schematic view showing the power source being integrated into the at least one illuminating device.

Depending upon different embodiment of the present invention, the power source 17 can be positioned in two different places within the present invention. However, the functionality of the power source 17 remains consistent within the present invention thus electrically powering the least one illuminating device 16. In some embodiment as shown in FIG. 3, the power source 17 is removably positioned within the storage compartment 12 thus enabling the functionality of converting the storage compartment 12 into an ice box. Furthermore, the power source 17 and the least one illuminating device 16 are electrically connected to each other by an electrical wire that is similar in length to the floating line 18. In some embodiment as shown in FIG. 4, the power source 17 is hermetically integrated into the at least one illuminating device 16 so that the storage compartment 12 is free of any obstruction. The power switch 22 enables a user to turn-on and turn off the at least one illuminating device 16 within the present invention. Preferably, the power switch 22 is integrated into the at least one illuminating device 16 or positioned adjacent to the power source 17 when the power source 17 is removably placed within the storage container 2.

Figure 5:
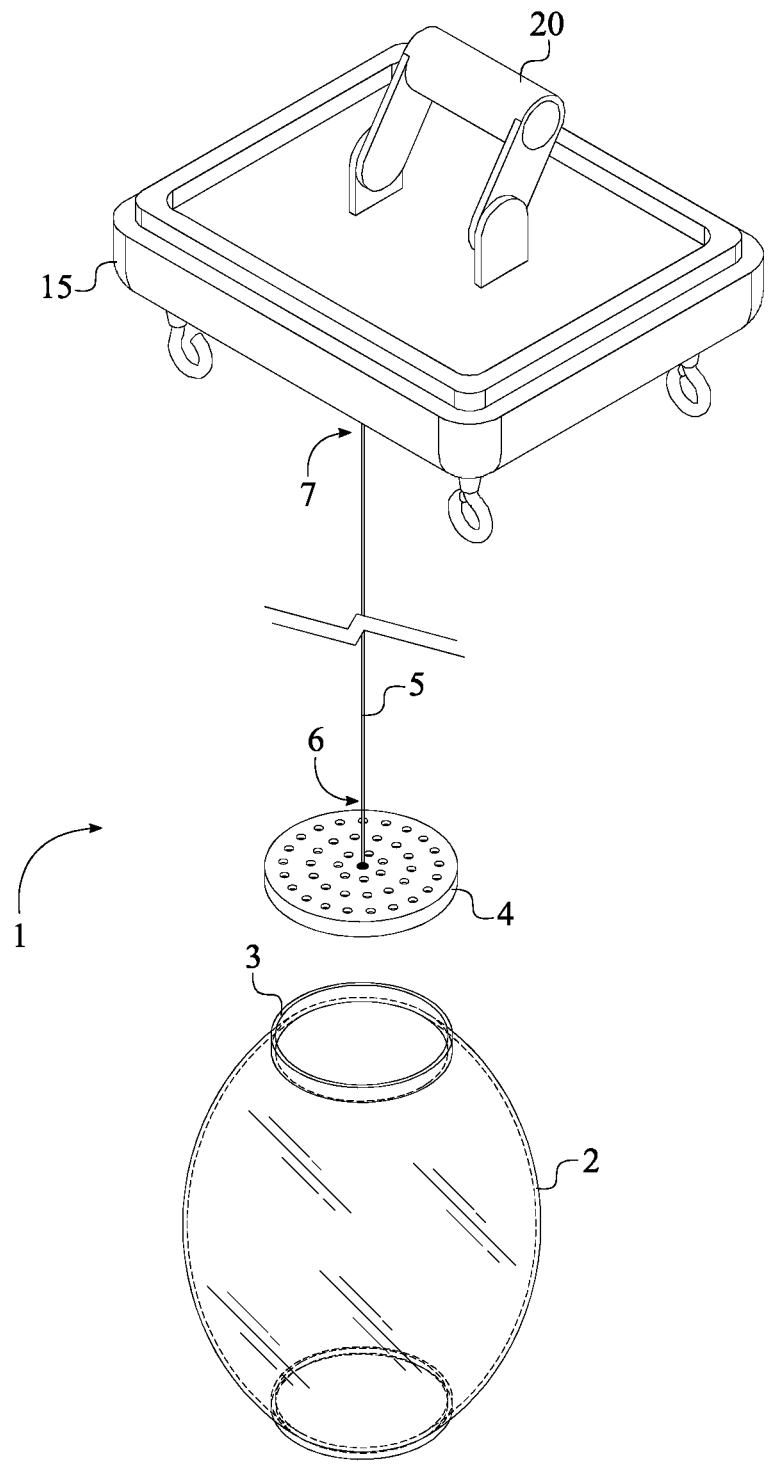
FIG. 5 is a perspective view of the bait reservoir and the floating deck.

The present invention further comprises at least one deck handle 20 as shown in FIG. 5 and FIG. 8. The deck handle 20 is oppositely positioned of the at least one illuminating device 16, about the floating deck 15 and hingedly connected to the floating deck 15. The deck handle 20 allows sufficient surface area to grip and maneuver the floating deck 15.

The present invention further comprises a plurality of legs 21 as shown in FIG. 2 and FIG. 8. The plurality of legs 21 is perimetrically positioned around the at least one illuminating device 16 and connected to the floating deck 15. Preferably, the plurality of legs 21 are connected at each corner of the floating deck 15 thus functioning as structural members to balance the floating deck 15 on flat surface. Furthermore, a height of each of the plurality of legs 21 is larger than the height of the at least one illuminating device 16. As a result, the plurality of legs 21 is able to maintain a gap between the at least one illuminating device 16 and the flat surface to protect the at least one illuminating device 16.

the at least one illuminating device 16 preferably comprises at least one Light-Emitting Diode (LED) light and a housing. More specifically, the LED light is integrated into the housing as the housing is connected onto the floating deck 15 in between the plurality of legs 21. The LED light can be blue LED light, white LED light, red LED light, or green Led light so that different light field can accommodate different fishing environments and conditions.

The method of operation of the present invention can require users to fill the storage container 2 with live and natural baits as well as an amount of water if necessary. The storage container 2 is then closed with the perforated lid 4 trapping the live and natural baits within the storage container 2. The floating deck 15 and the storage container 2 are tethered with the connector line 5 to a desired depth of water. After securing the bait reservoir 1 to the floating deck 15, users can submerge the bait reservoir 1 in the body of water and place the float deck on top of the body of water. The bait reservoir 1 is then suspended between a bottom floor of the body of water and the floating deck 15 as water leaks into the storage container 2 through the perforated lid 4. The bait reservoir 1 does not preferably hit or touch the bottom floor of the body of water. Thus, the suspended bait reservoir 1 enables optimal visibility of the live and natural baits within the storage container 2 to the surrounding marine life while allowing the live and natural baits to swim freely within a controlled and contained pattern inside the storage container 2. Depending upon different embodiment of the present invention, the users can turn-on the at least one illuminating device 16 on the floating deck 15 before or after setting free the floating deck 15. For example, when the power switch 22 is integrated into the at least one illuminating device 16, the power switch 22 is turn-on before the floating deck 15 is placed on top of the body of water. When the power switch 22 is positioned adjacent to the power source 17 that is removably placed within the storage container 2, the power switch 22 can be turn-on before or after the floating deck 15 is placed on top of the body of water. The floating deck 15 along with the bait reservoir 1 are then be deployed to the desired location in the body of water. Once the bait reservoir 1 and floating deck 15 have been placed in the desired location in the body of water, users can remove the power source 17 from the storage compartment 12 and the storage compartment 12 can be utilized as an ice box in some embodiment of the present invention. The cover 19 can then be utilized to fully close the insulated container 8 thus utilizing the storage compartment 12 in a similar manner as an ice box. The floating deck 15 may also be attached to a "trout-line" at a desired area by utilizing at least one fastener between the floating deck 15 and trout-line.

Although the invention has been explained in relation to its preferred embodiment, it is to be understood that many other possible modifications and variations can be made without departing from the spirit and scope of the invention as hereinafter claimed.

What is claimed is:

1. An illuminating marine fish attractor comprising:
   a bait reservoir;
   an insulated container;
   a floating deck;
   at least one illuminating device;
   at least one deck handle;
   a power source;
   a power switch;
   a floating line;
   a connector line, having a first end and a second end;
   the bait reservoir further comprising a storage container and a perforated lid attached to the rim of the storage container;
   the first end of the connector line being attached to the perforated lid;
   the second end of the connector line being centrally attached to the floating deck
   the least one illuminating device being fastened onto the floating deck;
   the least one illuminating device being electrically connected to the power source through the power switch;
   the at least one illuminating device being outside the bait reservoir;
   the at least one illuminating device being oriented toward the bait reservoir;
   the deck handle being oppositely positioned of the at least one illuminating device, about the floating deck;
   the deck handle being hingedly connected to the floating deck; and
   the floating deck and the insulated container being tethered to each other by the floating line.

2. The illuminating marine fish attractor as claimed in claim 1 comprising:
   the insulated container comprising a top edge, a base, a lateral wall, and a storage compartment;
   the top edge and the base being oppositely positioned of each other;
   the lateral wall being perimetrically connected around the base; and
   the storage compartment being delineated by the lateral wall and the base.

3. The illuminating marine fish attractor as claimed in claim 2 comprising:
   at least one container handle;
   the container handle being externally positioned to the insulated container; and
   the container handle being hingedly connected to the lateral wall.

4. The illuminating marine fish attractor as claimed in claim 2 comprising:
   at least one set of wheels;
   the set of wheels being externally positioned to the insulated container; and
   the set of wheels being rotatably connected to the base.

5. The illuminating marine fish attractor as claimed in claim 2 comprising:
   a cover;
   the cover being hingedly connected to the lateral wall;
   the cover being positioned adjacent to the top edge; and
   the storage compartment being selectively enclosed by the cover.

6. The illuminating marine fish attractor as claimed in claim 1, wherein the power source is removably positioned within a storage compartment of the insulated container.

7. The illuminating marine fish attractor as claimed in claim 1, wherein the power source is hermetically integrated into the at least one illuminating device.

8. The illuminating marine fish attractor as claimed in claim 1 comprising:
   a plurality of legs;
   the plurality of legs being perimetrically positioned around the at least one illuminating device; and
   the plurality of legs being connected to the floating deck.

9. The illuminating marine fish attractor as claimed in claim 8, wherein a height of each of the plurality of legs being larger than a height of the at least one illuminating device.

* * * * *